United States Patent [19]

Urata et al.

[11] Patent Number: 4,683,264
[45] Date of Patent: Jul. 28, 1987

[54] HARDENABLE COATING COMPOSITION FOR POLYPROPYLENE RESINS

[75] Inventors: Keiji Urata; Yoshio Kurome, both of Iwakuni, Japan

[73] Assignee: Sanyo-Kokusaku Pulp Co., Ltd., Tokyo, Japan

[21] Appl. No.: 849,441

[22] Filed: Apr. 8, 1986

Related U.S. Application Data

[63] Continuation-in-part of Ser. No. 645,103, Aug. 28, 1984, abandoned.

[30] Foreign Application Priority Data

Apr. 23, 1984 [JP] Japan ................... 59-80126

[51] Int. Cl.$^4$ ............ C08L 51/04; C08L 63/02
[52] U.S. Cl. ......................... 525/65; 525/119; 525/120; 525/121
[58] Field of Search .............. 525/119, 120, 121, 65

[56] References Cited

U.S. PATENT DOCUMENTS 2,977,334  3/1981  Zoff, Jr. et al. ............. 525/119
4,012,270  3/1977  Fitko ....................... 525/65
4,548,985  10/1985  Yazaki et al. ............... 525/65
4,550,130  10/1985  Kishida et al. .............. 525/65

FOREIGN PATENT DOCUMENTS 0875046  7/1971  Canada ..................... 525/119

50-37060  11/1975  Japan ...................... 525/121

Primary Examiner—John C. Bleutge
Assistant Examiner—Robert E. L. Sellers
Attorney, Agent, or Firm—Oblon, Fisher, Spivak, McClelland & Maier

[57] ABSTRACT (1) A hardenable coating composition for polypropylene resins, having a chlorinated polyolefin as a principal constitutional element provided partially a crosslinking reaction beforehand between carboxyl group or acid anhydride group of a chlorinated polyolefin (I) obtained by chlorinating, to a degree within a range from 10 wt % to 50 wt %, a polyolefin which is modified with one or two or more types of compounds selected from a group consisting of unsaturated polycarboxylic acids or their acid anhydrides and has a saponification value ranging from 6 to 60, and epoxy group of a compound or a resin (II) which has at least two epoxy groups per molecule.

(2) A hardenable coating composition for polypropylene resins described in claim 1, wherein the weight ratio of chlorinated polyolefin (I) to the compound or the resin (II) which has epoxy groups is 100:0.5–50.

(3) A hardenable coating composition for polypropylene resins described in claim 1 to claim 2, wherein tertiary amines are added to promote the crosslinking reaction between carboxyl group or acid anhydride group and epoxy group.

3 Claims, No Drawings

HARDENABLE COATING COMPOSITION FOR POLYPROPYLENE RESINS

This application is a continuation-in-part of U.S. application Ser. No. 645,103, filed on Aug. 28, 1984, now abandoned.

DETAILED DESCRIPTION OF THE INVENTION

A. Utilizable fields in the industry

The present invention relates to a hardenable coating composition usable for protecting or beautifying polypropylene resins, such as polypropylene, ethylene-propylene copolymer, ethylene-propylene-dien copolymer, etc., and more particularly to a hardenable coating composition which is satisfactory in respect to adhesiveness to the polypropylene resins, appearance, gasoline resistance, bending resistance, shock resistance, humidity resistance, water resistance, etc. when applied to sheets or moulded products made of the polypropylene resins.

B. Conventional techniques

Polypropylene resins are starting in use widely as the industrial materials for electrical household appliances, parts of motor vehicles, etc. on account of their light weights and low prices in addition to their excellent properties with respect to, for example, chemical resistance, ozone resistance, heat resistance, excellent electrical characteristics, etc., and are one of the materials, the increase in the demand thereof being most expected in the future.

Despite of such advantageous features, however, in the case of parts of motor vehicles, for example, while the efforts to reduce the weight by the use of various types of plastics from the viewpoint of energy conservation have been made and the quantity of the use of them increases year after year, the use of polypropylene resins still remains limited to a part. One of the reasons hindering the polypropylene resins from a wider range of applications resides in that they have nonpolarity and crystalline which make the coating and the adhesion difficult. There has been a strong desire, therefore, for the development of a coating composition that excels in adhesiveness to the polypropylene resins. Heretofore, on printing or adhesion to the polypropylene resins, the adhesiveness has been improved through the treatments such as corona discharge etc. However, these methods have a shortcoming incapable of treating the moulded products having complicated surfaces uniformly. Therefore, as a method to coat without these pretreatments, all sorts of primer coating compositions with good adhesiveness to polypropylene have been proposed. These include, for example, primer coating compositions comprising a cyclized rubber, an aromatic petroleum resin, an oil-soluble phenolic resin, a coumarone-indene resin and a chlorinated polyolefin as disclosed in Japan Patent Publications No. 18089/1974 and No. 5214/1974. However, they have such shortcomings that the adhesiveness to an upper coating layer is insufficient, though they have excellent adhesiveness to the polypropylene and that the solvent resistance is poor, even if they have excellent adhesiveness to both the polypropylene and the upper coating layer. Particularly, in the case of coated products adapted for the outdoor use such as motor vehicles, motorcycles, etc., a coating material that has a gasoline resistance as well as the stronger adhesiveness and the stronger weather resistance has been desired recently. To meet this requirement, a coating composition obtained by formulating a chlorinated polyolefin, an acrylic copolymer containing basic nitrogen and an epoxy resin as disclosed in Japan Unexamined Patent Publication No. 76433/1981 and a coating composition obtained by formulating an epoxy resin into a chlorinated polyolefin and a copolymer of acrylic monomer containing basic nitrogen with other acrylic monomer as disclosed in Japan Unexamined Patent Publication No. 50971/1981 are proposed. However, in order to obtain a satisfactory film performance, the content of chlorinated polyolefin in the coating resin should be reduced. As a result, there arised a problem that the compositions do not have sufficient adhesiveness to polypropylene resins in general use, though they adhere to specific polypropylene resins.

C. Problems to be solved by the invention

To solve the problems described above, the inventors noted the reactivity of carboxyl group or acid anhydride group with epoxy group, and already proposed a coating composition having a chlorinated polyolefin (I) modified with carboxyl group or acid anhydride group and a compound or a resin (II) which has at least two epoxy groups per molecule as principal constitutional elements in Japan Patent Application No. 187946/1982. However, this method had a shortcoming that too much time was required to form the hardened film. This shortcoming was improved by the invention.

D. Means to solve the problems

Namely, the inventors have discovered that a hardenable coating composition having a chlorinated polyolefin which has carboxyl group or acid anhydride group and epoxy group as a principal constitutional element provided partially a crosslinking reaction beforehand between carboxyl group or acid anhydride group of a chlorinated polyolefin (I) obtained by chlorinating, to a degree within a range from 10 wt% to 50 wt%, a polyolefin which is modified with one or two or more types of compounds selected from a group consisting of unsaturated polycarboxylic acids or their acid anhydrides and has a saponification value ranging from 6 to 60, and epoxy group of a compound or a reain (II) which has at least two epoxy groups per molecule can shorten the time required to form the hardened film and has excellent gasoline resistance as well as excellent adhesiveness, appearance, bending resistance, shock resistance, humidity resistance and water resistance when applied to the polypropylene resins, leading to the invention.

By the way, it is publicly known from Japan Patent Publication No. 10916/1975 that a chlorinated product of poly-α-olefin containing carboxyl group is usable as a primer coating material. However, this compound does not have the solvent resistance.

Chlorinated polyolefin (I) usable in the invention can be manufactured in accordance with publicly known methods. In one example of such manufacturing methods, polyolefin resins such as crystalline polypropylene, amorphous polypropylene, polybutene-1, polypentene-1, 4-methylpentene-1, low density polyethylene, ethylene-propylene copolymer and the like are heat-melted either singly or in a state of mixture of two or more resins. If necessary, viscosity may be reduced by the thermal decomposition process.

The polyolefin starting materials of this invention have molecular weights within the range of 12,000 to 200,000. Since the starting material of this invention has a high molecular weight, the intermediate polymer which has only been subjected to a graft polymerization is in the solid state and is generally insoluble in solvents (such as toluene or xylene) at room temperature. This intermediate polymer cannot be used in applications for coating without some treatment. In order to make the intermediate polymer soluble in solvents, the intermediate polymer is further subjected to chlorination to give a polymer product which is soluble in solvents at ordinary temperatures.

When the starting polyolefin contains propylene units, the propylene content is required to be from about 10 to 40 wt. %, or greater than 80 wt. % in this invention. A random polymer having a weight % of propylene within the range of 40 to 80 wt. % is soluble according to Encyclopedia of Polymer Science and Technology, Vol. 6, page 350, FIG. 9 and lines 18–21, which is incorporated herein by reference. Accordingly, this type of soluble polymer can be applied as a coating composition without chlorination. On the other hand, crystalline polyethylene is insoluble in solvents at room temperature but becomes soluble in solvents in proportion to the degree of chlorination thereof. After the melted resin of polyolefin thus obtained is modified with unsaturated polycarboxylic acid or its acid anhydride in the presence of a radical-generating agent in either a batch process or a continuous process, the modified resin is dispersed or dissolved into a solvent for the chlorinaton, and the reaction is carried out by blowing chlorine gas at a temperature of 50° to 120° C. either in the presence of a catalyst or under irradiation of ultraviolet rays and under pressure or under atmospheric pressure to obtain the chlorinated polyolefin (I).

As the radical-generating agents to be used in the modifying reaction, there are, for example, peroxides such as di-tert-butyl peroxide, tert-butyl hydroperoxide, dicumyl peroxide, benzoyl peroxide, tert-butyl peroxide benzoate, methyl ethyl ketone peroxide, di-tert-butyl diperphthalate, etc. and azo nitriles such as azobisisobutyronitrile, azobisisopropionitrile, etc. Also, as the unsaturated polycarboxylic acids or their acid anhydrides to be used in the modifying reaction, there are, for example, maleic acid, maleic anhydride, citraconic acid, citraconic anhydride, fumaric acid, mesaconic acid, itaconic acid, itaconic anhydride, aconitic acid, aconitic anhydride, etc.

The saponification value of the polyolefin modified with the unsaturated polycarboxylic acid or its acid anhydride to be used in the invention is at least 6 and preferably between 10 and 60. With the saponification value too low, an effect obtainable through the crosslinking with the compound or the resin (II) having epoxy groups would decrease resulting in the lowering in solvent resistance. Also, if the saponification value is too high, the adhesiveness to polypropylene resins would become poor. The degree of chlorination of the chlorinated polyolefin (I) is between 10 wt% and 50 wt% and preferably within a range from 15 wt% to 35 wt%. If the chlorination degree is low, the state of solution would become inferior, while, if the chlorination degree is high, the adhesiveness to polypropylene resins would become insufficient.

The compound or the resin (II) which has at least two epoxy groups per molecule to be used in accordance with the invention is preferable to have good compatibility with the chlorinated polyolefin (I). As such compounds or resins, there are bisphenol A types and glycidyl ether types of polyhydric alcohol, for example, ethylene glycol glycidyl ether, propylene glycol glycidyl ether, glycerol polyglycidyl ether, sorbitol polyglycidyl ether, etc. In addition, there are also cyclic aliphatic epoxy resins obtained by oxidizing olefins with peracid and acrylic epoxy compounds obtained by co-polymerizing glycidyl methacrylate with methacrylate, and those containing at least two epoxy groups in each molecule are all possible to be used.

The formulating ratio of the chlorinated polyolefin (I) to the compound or the resin (II) having epoxy groups is preferable to be within a range of 100:0.5–50 expressed in parts by weight on putting the invention into effect. This is due to the facts that if the compound or the resin (II) having epoxy groups is in the ratio not exceeding 0.5, the solvent resistance is insufficient and if the ratio exceeds 50 on the contrary, the adhesiveness to sheets or moulded products made of the polypropylene resins is lowered.

Further, to promote the crosslinking reaction between epoxy group and carboxylic group or acid anhydride group, it is preferable to add the basic catalysts, that is, tertiary amines such as pyridine, isoquinoline, quinoline, N,N-dimethylcyclohexylamine, triethylamine, benzyldimethylamine, 1,8-diazo-bicycloundecene-7 and its amine salts, etc., tin octylate, $BF_3$-monoethylamine and the like. These promoters can be added in amount ranging from 0.01 wt% to 5.0 wt% to the solid content of the chlorinated polyolefin (I), though never limited to that range. Also, in the case of acid anhydride group, polyols such as ethylene glycol, trimethylolpropane, polypropylene glycol, etc. may be added as the reaction initiators.

The method to provide the crosslinking reaction partially beforehand between the chlorinated polyolefin (I) and the epoxy compound or resin (II) in accordance with the invention may be practiced as follows: After chlorinated the polyolefin modified with unsaturated polycarboxylic acid or acid anhydride in the solvent for the chlorination, the solvent is distilled off by the distillation and displaced with aromatic solvents such as toluene, xylene, etc. To the chlorinated polyolefin (I) thus obtained is added the compound or the resin (II) which has at least two epoxy groups per molecule and the mixture is subjected to heat treatment.

Explaining the partial crosslinking in the invention taking up the reaction between the chlorinated polyolefin (I) modified with maleic anhydride and the epoxy compound or resin (II) as an example, with the progress of the reaction of said chlorinated polyolefin (I) with the compound or the resin (II) having epoxy groups, the absorption in the neighborhood of 1780 $cm^{-1}$ which is measured by using infrared spectrophotometer and due to maleic anhydride decreases, while, the absorption in the neighborhood of 1730 $cm^{-1}$ due to ester increases, and simultaneously the viscosity of the solution rises. At this time, the reaction time can be shortened by adding the catalysts such as tertiary amines etc.

As the solvents to be used for the hardenable coating composition according to the invention, the aromatic solvents such as toluene, xylene, etc. are most preferable. In addition, solvents based on the saturated cyclic hydrocarbons such as cyclohexane, methylcyclohexane, ethylcyclohexane, etc. are also good solvents. Besides, such solvents as ester solvents, ketone solvents, alcohol solvents, etc. may be used in a state of being partially mixed. As the fillers, inorganic pigments such as titanium dioxide, talc, calcium carbonate, etc. and other organic pigments can be used.

E. Function

A feature of the present invention resides in that, through providing partially the crosslinking reaction beforehand between the chlorinated polyolefin (I) obtained by chlorinating the polyolefin which is modified with unsaturated polycarboxylic acid or its acid anhydride and the epoxy compound or resin (II) which has at least two epoxy groups per molecule, the shortcoming that the time required to form the hardened film is long when using the coating composition proposed before in Japan Patent Application No. 187946/1982 by the inventors is improved and the time for the formation of hardened film is made to shorten.

With the hardenable coating composition according to the invention applied to the surface of sheets or moulded products made of the polypropylene resins, one coat finished film can be obtained by drying the hardenable coating composition at a temperature ranging from room temperature to 150° C. after allowing it to dry by air at room temperature. The film thus obtained excels in appearance, gasoline resistance, water resistance, humidity resistance, chemical resistance, bending resistance, shock resistance, etc. Moreover, compared with other one coat finished film used for the similar purpose, the hardenable coating compound according to the invention much excels in adhesiveness to the substrate, and is applicable not only to the polypropylene resins but also to the substrates such as other types of plastics, wood, concrete, etc.

The coating composition according to the invention is also usable as a primer coating material. As the coating materials to be applied on top of it at this time, the existing coating materials, for example, urethane resin coating materials, melamine resin coating materials, epoxy resin coating materials, acrylic resin coating materials, alkyd resin coating materials, etc. are suited. Compared with the film used the conventional primer coating material, one used the invented coating composition excels in gasoline resistance, water resistance, humidity resistance, chemical resistance, bending resistance, shock resistance, etc. and shows strong adhesiveness both to the substrate and to the upper coating material.

F. Examples

In following, the invention will be explained in more detail using examples, but the invention is not confined to them.

EXAMPLE 1

Into a three-necked flask equipped with a stirrer, a dropping funnel and a cooling tube to reflux the monomer, were placed 500 g of isotactic polypropylene, the melt viscosity thereof being about 2600 cps at 180° C., and polypropylene was completely melted in an oil bath kept at a constant temperature of 180° C. After displaced the inside of the flask with nitrogen for about 10 minutes, 20 g of maleic anhydride were thrown in over a period of about 5 minutes under stirring. Then, a solution of 2 g of di-tert-butyl peroxide dissolved into 10 ml of heptane was thrown in from the dropping funnel over a period of 30 minutes. At this time, the whole system was kept at 180° C. After allowing the reaction to continue further for about 1 hour, nonreacted maleic anhydride was removed over a period of about 30 minutes while the pressure inside the flask was reduced by aspirator.

The saponification value of this reaction product was 26. Following that, 300 g of this product were thrown into a reaction kettle provided with glass lining. To this were added 5 liters of carbon tetrachloride. After dissolved thoroughly at 110° C. under pressure of 2 kg/cm$^2$, gaseous chlorine was blown in from the bottom of the reaction kettle with the irradiation of ultraviolet rays until a chlorination degree of 24 wt% was obtained. Upon completion of the reaction, carbon tetrachloride, that is the solvent, was distilled off by evaporator and displaced with toluene to obtain a 20 wt% toluene solution of the chlorinated polypropylene modified with maleic anhydride.

EXAMPLE 2

Using 500 g of isotactic polypropylene used in Example 1, 30 g of maleic anhydride and 2 g of di-tert-butyl peroxide, maleic anhydride-modified polypropylene having a saponification value of 37 was obtained by the same method as in Example 1. After that, the chlorination reaction was carried out in a manner similar to Example 1 to obtain a 20 wt% toluene solution of maleic anhydride-modified chlorinated polypropylene having a chlorination degree of 26 wt%.

EXAMPLE 3

Using 500 g of ethylene-propylene copolymer, the melt viscosity thereof being about 5000 cps at 180° C. and the ethylene content thereof being 4.2 wt%, 30 g of maleic anhydride and 3 g of di-tert-butyl peroxide, maleic anhydride and di-tert-butyl peroxide were simultaneously and successively added over a period of about 30 minutes at a reaction temperature of 200° C., With the exception of that, the same method was adopted as in Example 1. The saponification value of maleic anhydride-modified ethylene-propylene copolymer thus obtained was 32. Following that, the chlorination reaction was carried out in a manner similar to Example 1 to obtain a 20 wt% toluene solution of maleic anhydride-modified chlorinated ethylene-propylene copolymer having a chlorination degree of 27 wt. %.

EXAMPLE 4

Into a three-necked flask equipped with a stirrer, a thermometer and a cooling tube to reflux the solvent, were placed 500 g of the chlorinated product (20 wt% toluene solution) obtained in Example 2. To this were added 10 g of Epicote 828 (epoxy resin, a condensation product of bisphenol A with epichlorohydrin having an epoxy equivalent of 184 to 194, manufactured by Shell Chemical Corp.) and, as a reaction promoter, 1 g of a 10 wt% xylene solution of amine-type catalyst U-Cat SA-No. 102 (manufactured by Sanavot Co.). The solution viscosity of this content was 22 cps at 25° C. Then, the content was allowed to react for 5 hours at 85° C. under stirring. The solution viscosity of this reaction product was 39 cps at 25° C. and the ratio of the absorbancy in the neighborhood of 1780 cm$^{-1}$ which was measured by using infrared spectrophotometer and due to maleic anhydride to the absorbancy in the neighborhood of 1730 cm$^{-1}$ due to ester, namely the value of absorbancy around 1730 cm$^{-1}$/absorbancy around 1780 cm$^{-1}$ was 0.40. Next, 30 g of titanium dioxide were mixed in 350 g of this product, and the pigment was dispersed for 1 hour by the use of sand mill. To this were formulated 4 g of Epicote 828 and were added 6 g of a 10 wt% xylene solution of U-Cat SA-No. 102 as a reaction promoter. Then, the mixture was diluted to a suitable viscosity with toluene and spray-coated on a polypropylene plate (2×50×80 mm), the surface thereof having been washed with toluene. After air-dried for about 15 minutes at room temperature, the coated surface was forcedly dried for 30 minutes at 130° C. It was then left to stand for 24 hours in the room and subjected to tests for the film. Results are shown in Table 1.

EXAMPLE 5

Into 500 g of the chlorinated product (20 wt% toluene solution) obtained in Example 2 were mixed 10 g of Denacol EX-611 (epoxy resin, sorbitol polyglycidyl ether having an epoxy equivalent of 170, dealed by Nagase Industries Co.) and the mixture was allowed to react for 12 hours at 85° C. employing the similar equipment as in Example 4.

The solution viscosity of this mixture was 22 cps at 25° C. before the reaction. After the reaction, the solution viscosity of the product was 45 cps at 25° C., and the value of absorbancy around 1730 $cm^{-1}$/absorbancy around 1780 $cm^{-1}$ was 0.56.

Next, 30 g of titanium dioxide were mixed in 350 g of the product obtained above, and the pigment was dispersed for 1 hour by using sand mill. To this was formulated a solution of 3 g of Denacol EX-611 dissolved into 10 g of ethyl acetate and were added 7 g of a 10 wt% xylene solution of U-Cat SA-No. 102 as a reaction promoter. Then, a test plate was prepared in the same manner as in Example 4, and the tests for the film were conducted. Results are shown in Table 1.

EXAMPLE 6

Into 500 g of the chlorinated product (20 wt% toluene solution) obtained in Example 3 were mixed 7 g of Denacol EX-421 (epoxy resin, diglycerol polyglycidyl ether having an epoxy equivalent of 155, dealed by Nagase Industries Co.) and was added further 1 g of a 10 wt% xylene solution of U-Cat SA-No. 102 as a reaction promoter, and the mixture was allowed to react for 2 hours at 85° C. employing the similar equipment as in Example 4.

The solution viscosity of this mixture was 33 cps at 25° C. before the reaction. After the reaction, the solution viscosity of the product was 55 cps at 25° C., and the value of absorbancy around 1730 $cm^{-1}$/absorbancy around 1780 $cm^{-1}$ was 0.45.

Following that, 30 g of titanium dioxide were mixed in 350 g of this product, and the pigment was dispersed for 1 hour by using sand mill. To this was formulated a solution of 3 g of Denacol EX-421 dissolved into 10 g of ethyl acetate and were added, as a reaction promoter, 6 g of a 10 wt% xylene solution of U-Cat SA-No. 102. Then, the mixture was coated on a polypropylene plate (2×50×80 mm) in the same manner as in Example 4. After air-dried for about 15 minutes, the coated surface was forcedly dried for 30 minutes at 120° C. It was then left to stand for 24 hours in the room and subjected to the tests for the film. Results are shown in Table 1.

COMPARATIVE EXAMPLE 1

The solution viscosity of the chlorinated product (20 wt% toluene solution) obtained in Example 2 was 22 cps at 25° C. Without allowing to react, 350 g of this solution, as it was, and 30 g of titanium dioxide were mixed and the pigment was dispersed for 1 hour by using sand mill. To this were formulated 11 g of Epicote 828 and added 7 g of a 10 wt% xylene solution of amine-type catalyst U-Cat SA-No. 102 as a reaction promoter. After prepared a test plate in the same manner as in Example 4, tests for the film were conducted. Results are shown in Table 1.

COMPARATIVE EXAMPLE 2

The solution viscosity of the chlorinated product (20 wt% toluene solution) obtained in Example 2 was 22 cps at 25° C. Without allowing to react, 350 g of this solution, as it was, and 30 g of titanium dioxide were mixed and the pigment was dispersed for 1 hour by using sand mill. To this was formulated a solution of 10 g of Denacol EX-611 dissolved into 20 g of ethyl acetate and were further added 7 g of a 10 wt% xylene solution of U-Cat SA-No. 102 as a reaction promoter. After prepared a test plate in the same manner as in Example 4, tests for the film were conducted. Results are shown in Table 1.

COMPARATIVE EXAMPLE 3

The solution viscosity of the chlorinated product (20 wt% toluene solution) obtained in Example 3 was 33 cps at 25° C. Without allowing to react, 350 g of this solution, as it was, and 30 g of titanium dioxide were mixed and the pigment was dispersed for 1 hour by using sand mill. To this was formulated a solution of 7.8 g of Denacol EX-421 dissolved into 20 g of ethyl acetate and were further added 7 g of a 10 wt% xylene solution of U-Cat SA-No. 102 as a reaction promoter. The mixture was coated on a polypropylene plate (2×50×80 mm) in the same manner as in Example 4. After air-dried for about 15 minutes, the coated surface was forcedly dried for 30 minutes at 120° C. It was then left to stand for 24 hours in the room and tests for the film were conducted. Results are shown in Table 1.

TABLE 1

|  | Example 4 | Example 5 | Example 6 | Comparative example 1 | Comparative example 2 | Comparative example 3 |
| --- | --- | --- | --- | --- | --- | --- |
| Adhesiveness Cross-cut test, Cellophane adhesive tape | 100/100 | 100/100 | 100/100 | 100/100 | 100/100 | 100/100 |
| Gasoline resistance (Japan Petroleum Co., Regular) | Normal | Normal | Normal | Decrease in film gloss | Decrease in film gloss | Decrease in film gloss |
| Gloss (60° Specular reflectance) | 92 | 90 | 93 | 91 | 91 | 92 |
| Pencil hardness | H | H | H | HB | F | HB |
| Bending resistance | Excellent | Excellent | Excellent | Excellent | Excellent | Excellent |
| Shock resistance | Excellent | Excellent | Excellent | Excellent | Excellent | Excellent |
| Water resistance (50° C.) | Normal | Normal | Normal | Decrease in film gloss | Decrease in film gloss | Decrease in film gloss |
| Humidity resistance | Normal | Normal | Normal | Decrease in | Decrease in | Decrease in |

TABLE 1-continued

| | Example 4 | Example 5 | Example 6 | Comparative example 1 | Comparative example 2 | Comparative example 3 |
|---|---|---|---|---|---|---|
| (50° C., 98% RH) | | | | film gloss | film gloss | film gloss |

TEST PROCEDURES

Adhesiveness: On the coated surface, 100 sections of a lattice were cross-cut so as to reach to the substrate at intervals of 1 mm. A cellophane adhesive tape was tightly applied to the lattice and then was peeled off at an angle of 180° C. Then, the number of lattice sections remaining not peeled was counted.

Gasoline resistance: On the coated surface, a scratch (X mark) was drawn so as to reach to the substrate. After immersed in Regular gasoline for 2 hours at 25° C., the state of the film was examined.

Bending resistance: The state of the film was examined when bent by 180° C. with a ½ inch diameter mandrel.

Shock resistance: Du Pont-type impact tester with a hitting core having a diameter of ½ inch and a load of 500 g was used. The core was allowed to fall at a distance of 50 cm for hitting on the surface and at a distance of 25 cm for hitting on the reverse side.

Water resistance: After immersed in warm water of 50° C. over a period of 240 hours, the state of the film was examined.

Humidity resistance: After left to stand under an atmosphere of temperature of 50° C. and relative humidity of more than 98% over a period of 240 hours, the state of the film was examined.

Between the chlorinated products provided the partial corsslinking reaction beforehand as in Example 4, 5 and 6 and those provided no reaction as in Comparative example 1, 2 and 3, a very predominant difference can be seen in gasoline resistance, water resistance and humidity resistance as indicated in Talbe 1.

EXAMPLE 7

Into 500 g of the chlorinated product (20 wt% toluene solution) obtained in Example 1 were mixed 4 g of Epicote 828 and added further 0.5 g of a 10 wt% xylene solution of U-Cat SA-No 102. The mixture was allowed to react for 15 hours at 85° C. employing the similar equipment as in Example 4.

The solution viscosity of this mixture was 25 cps at 25° C. before the reaction. After the reaction, the solution viscosity of the product obtained above was 28 cps at 25° C. and the value of absorbancy around 1730 $cm^{-1}$/absorbancy around 1780 $cm^{-1}$ was 0.23.

Next, 4 g of titanium dioxide and 0.1 g of carbon black were mixed in 200 g of this product, and the pigments were dispersed for 1 hour by the use of sand mill. After that, the mixture was diluted to a suitable degree with toluene and spray-coated on a polypropylene plate (2×50×80 mm), the surface thereof having been washed with toluene, so as to obtain a film thickness of 5 to 10μ. After several minutes, a two-component hardenable-type urethane coating material (manufactured by Japan Oils and Fats Co.) was spray-coated so as to obtain a film thickness of 30 to 40μ. After dried by air for about 15 minutes, the coated surface was forcedly dried for 30 minutes at 80° C. and further left to stand for 24 hours in the room to conduct the tests for the film. The film obtained was excellent in gasoline resistance, bending resistance, shock resistance, humidity resistance, water resistance, etc. and the adhesiveness was also extremely satisfactory.

EXAMPLE 8

Employing 500 g of an isotactic polypropylene having a melt viscosity at 180° C. of 120 cps, 30 g of maleic anhydride and 2 g of di-tert-butyl peroxide, a polypropylene modified with maleic anhydride having a saponification value of 37 was obtained in the same manner as in Example 1. Then, upon chlorinating the modified polypropylene according to the manner described in Example 1, a 20 wt. % toluene solution of a chlorinated polypropylene modified with maleic anhydride having a chlorination degree of 20 wt. % was obtained.

COMPARATIVE EXAMPLE 4

On finely pulverizing the polyolefins modified with maleic anhydride obtained in Example 2, Example 3 and Example 8 respectively, coating compositions were prepared by mixing with a sand-mill for one hour. Their formulations are shown in the following Table 2.

TABLE 2

| | No. of coating composition | | |
|---|---|---|---|
| Component | 1 | 2 | 3 |
| modified polyolefin obtained in Example 2 (M.W. ca 50,000) | 70 g | — | — |
| modified polyolefin obtained in Example 3 (M.W. ca 80,000) | — | 70 g | — |
| modified polyolefin obtained in Example 8 (M.W. ca 15,000) | — | — | 70 g |
| Titanium dioxide | 30 g | 30 g | 30 g |
| Epicote 828 | 11 g | 10 g | 11 g |
| U-Cat. SA-No. 102 (10 wt % xylene solution) | 6 g | 6 g | 6 g |
| Toluene | 280 g | 280 g | 280 g |

After mixing, polyolefin and titanium dioxide precipitated in case No. 1, No. 2 and No. 3 coating compositions, and moreover the distribution of the pigment was inferior, which made the applicability of coating composition infeasible.

EXAMPLE 9

Employing the chlorinated polyolefins modified with maleic anhydride obtained in Example 2, Example 3 and Example 8 respectively, coating compositions were prepared. Their formulations are shown in the following Table 3.

TABLE 3

| | No. of coating composition | | |
|---|---|---|---|
| Component | 4 | 5 | 6 |
| Chlorinated polyolefin obtained in Example 2 (20 wt % toluene soln.) | 350 g | — | — |
| Chlorinated polyolefin obtained in Example 3 (20 wt % toluene soln.) | — | 350 g | — |
| Chlorinated polyolefin obtained in Example 8 (20 wt % toluene soln.) | — | — | 350 g |
| Titanium dioxide | 30 g | 30 g | 30 g |
| Epicote 828 | 11 g | 10 g | 11 g |
| U-Cat SA-No. 102 | 6 g | 6 g | 6 g |

On preparing coating compositions of No. 4 and No. 5, there was no precipitation of either the chlorinated polyolefin or titanium dioxide, after said mixing and moreover the distribution of the pigment was excellent, which made the applicability of coating feasible.

The above observations are based on the fact that while the polyolefin which is a starting material of this invention is inferior in solubility to solvents, the chlorinated polyolefin is soluble in solvents and, in addition, the latter provides a pigment such as titanium dioxide with a good distribution.

What is claimed is:

1. A hardenable coating composition for polypropylene resins which is obtained by modifying a polyolefin resin having a molecular weight of from 12,000 to 200,000, wherein said polyolefin contains from 10 to 40 or greater than 80 weight percent of propylene, with at least one unsaturated polycarboxylic acid or an anhydride of said acid, to produce a solid modified polyolefin having a saponification value of from about 6 to 60, chlorinating said solid modified polyolefin to a degree of from about 10% to 50% by weight of chlorine content to produce a chlorinated modified polyolefin, and partially crosslinking carboxyl groups or acid anhydride groups on said chlorinated modified polyolefin with an epoxy group of a compound which has at least two epoxy groups per molecule.

2. A hardenable coating composition for polypropylene resins described in claim 1, wherein the weight ratio of chlorinated modified polyolefin to the compound which has at least two epoxy groups is 100:0.5-50.

3. A hardenable coating composition for polypropylene resin described in claim 1, wherein tertiary amines are added to promote the crosslinking reaction between said carboxyl groups or acid anhydride groups and said epoxy groups.

* * * * *